United States Patent [19]

Ahnemiller

[11] 4,401,771
[45] Aug. 30, 1983

[54] METHOD FOR PREPARING POLYESTER FOAM USING COBALT/POTASSIUM PROMOTORS

[75] Inventor: James Ahnemiller, Middlebury, Conn.

[73] Assignee: Uniroyal, Inc., New York, N.Y.

[21] Appl. No.: 399,517

[22] Filed: Jul. 19, 1982

[51] Int. Cl.$^3$ .............................................. C08J 9/10
[52] U.S. Cl. .................................. 521/121; 521/124; 521/125; 521/138; 521/182
[58] Field of Search ............... 521/121, 124, 125, 138, 521/182

[56] References Cited

U.S. PATENT DOCUMENTS 4,322,502  3/1982  Stott et al. ........................ 521/182
4,327,196  4/1982  West et al. ........................ 521/182

Primary Examiner—Morton Foelak
Attorney, Agent, or Firm—Andrew D. Maslow

[57] ABSTRACT

A foamable and simultaneously curable polyester composition is provided. The composition consists essentially of the following (all being in parts by weight):
(a) 100 parts liquid unsaturated polyester resin,
(b) 0.5 to 10 parts monosubstituted sulfonyl hydrazide having the formula $RSO_2NHNH_2$, wherein R is $C_1$-$C_{12}$ alkyl, $C_5$-$C_6$ cycloalkyl, $C_7$-$C_{10}$ aralkyl, phenyl, naphthyl, or phenyl substituted with halogen, $C_1$-$C_{12}$ alkyl or $C_1$-$C_{12}$ alkoxy,
(c) 0.1 to 5.0 parts of a promoter, said promoter consisting essentially of a mixture of organic heavy metal salt and organic alkali metal salt, wherein the heavy metal/alkali metal molar ratio is from 10/1 to 1/10.
(d) 0 to 2 parts surfactant,
(e) 0 to 250 parts of filler, and
(f) 0.3 to 5 parts of a cross-linking initiating compound selected from organic peroxides and organic hydroperoxide.

8 Claims, No Drawings

METHOD FOR PREPARING POLYESTER FOAM USING COBALT/POTASSIUM PROMOTORS

The present invention relates to a method for simultaneously foaming and curing a polyester resin using mono-substituted sulfonyl hydrazides, organic peroxide and a combination of certain metal promoters. Also provided is a composition capable of providing a cured and expanded polyester product.

The use of certain sulfonyl hydrazides for preparing polyester foams has been disclosed in the prior art. U.S. Pat. No. 3,920,590, to Jacobs, et al teaches the use of sulfonyl hydrazides at very high concentrations of peroxide catalyst and of cobalt promoter; and U.S. Pat. No. 3,920,591, to Jacobs, et al, discloses the use of sulfonyl hydrazides in conjunction with aliphatic amine redox compounds.

It has now been found that polyester resin containing a monosubstituted sulfonyl hydrazide and a combination of an organic heavy metal salt with an organic alkali metal salt, may be simultaneously expanded and cured when adding an organic peroxide or an organic hydroperoxide.

It is particularly surprising that combination of organic heavy metal and organic alkali metal salts are useful for the purpose of promoting the cure and expansion of polyester foams since organic alkali metal salts are essentially ineffective when employed as the sole promoter. It is further unexpected that an organic metal salt combination based, for instance, on cobalt and potassium, is more effective than a cobalt-type promoter used in the absence of the alkali metal salt. For this reason it is not only desirable to carry out expansion and cure of polyester resin because of improved efficacy of the promoter combination, but also because of the improved cost effectiveness of such combination since actual levels of costly heavy metal such as cobalt salt can be replaced by less expensive alkali metal salt. The requirement of total metal level of the combination of this invention may be reduced to essentially achieve the same effect of the heavy metal salt alone.

The polyester resins (PER) employed are liquid unsaturated polyester resins and comprise a linear or only slightly branched polyester resin and an ethylenically unsaturated monomeric compound. The resin, per se, is typically prepared as a condensation or polyesterification reaction product of an unsaturated polybasic and a polyhydric compound; for example, the condensation product of an unsaturated dibasic acid of alpha-beta ethylenic unsaturation or a di- or trihydric compound, such as a glycol. Often a saturated polybasic acid or anhydride, such as a dibasic acid, is employed with the unsaturated acid or anhydride to modify the reactivity of the unsaturated resin.

Examples of saturated polybasic acids include, but are not limited to: isophthalic acid; orthophthalic acid, terephthalic acid, tetrabromophthalic acid, tetrachlorophthalic acid, tetrahydrophthalic acid, adipic acid, succinic acid, azelaic acid, glutaric acid, nadic acid and the various anhydrides obtained therefrom. Unsaturated polybasic acids include, but are not limited to: maleic acid, fumaric acid, itaconic acid, citraconic acid and anhydrides obtained therefrom.

At times, unsaturated acid or anhydride substituted bridged ring polyenes are used to modify cure characteristics of the resins.

Typical polyhydric alcohols include, but are not limited to: ethylene glycol, 1,2-propanediol; 1,3-propanediol, diethylene glycol, dipropylene glycol, triethylene glycol, tripropylene glycol, 1,2-butanediol, 1,3-butanediol, 1,4-butanediol, neopentyl glycol, 2,2,5-trimethylpentanediol, cyclohexanedimethylol, dibromoneopentyl glycol, dibromobutanediol, trimethylolpropane, pentacrythritol-, trimethylpentanediol, dipropoxy adducts of bisphenol A, and dipropoxy adducts of hydrogenated bisphenol A.

Examples of ethylenically unsaturated monomers employed with the linear polyesters include, but are not limited to: styrene, vinyl toluene, acrylates and methacrylates like methylmethacrylate, alphamethyl styrene, chloro styrene, and diallyl phthalate. The ratio of the resin, per se, to unsaturated monomer may vary from 75/25 to 50/50 by weight. See, for example, U.S. Pat. Nos. 2,255,313, Ellis, Sept. 9, 1941, 2,667,430, Wells, Jan. 26, 1954; or 3,267,055, Amidon, Aug. 15, 1966, for further details of suitable polyester compositions comprising an unsaturated linear or slightly branched polyester and a copolymerizable ethylenic monomer which is a solvent for the polyester to provide a liquid composition capable of cross-linking to a solid state in the presence of a peroxide or hydroperoxide catalyst or polymerization initiator. Unless otherwise indicated, the expression "polyester resin" as used herein has reference to such a composition.

The liquid unsaturated polyester resins also typically contain small amounts of inhibitors in order to prevent premature reaction, such as hydroquinone, quinone and tertiary butyl catechol, as well as a wide variety of other additives such as: viscosity index improvers, rheological agents, flame retardants, thermoplastic polymers, pigments, dyes, stabilizers, glass fibers, release agents, extenders, alumina surfactants and other additives. Fillers may also be included in polyester resins such as hollow glass or plastic microsphere beads, wood flour, silica, diatamacieous earth, ground glass, etc.

The components of the polyester resins may be varied as is known in the art to impart the desired properties to the cured resin. Flexible resins employ greater amounts of adipates or azeleates, while more rigid resins use phthalates, with a variety of different glycols. This invention is useful for making rigid and semirigid polyester foams suitable as structural-type foams. Such resins have a formulation, for example, of about 3 to 5 moles of glycol, 1.5 to 3.0 moles of adipic acid, and 0 to 1.5 moles of phthalic anhydride, with from 1.0 to 2.5 moles of styrene or vinyl toluene.

Resin containing higher amounts of linear dibasic glycols and linear dibasic acids, e.g., over 70%, while maintaining a low amount of aromatic dihydric acids and anhydrides, unsaturated acids, and monomers, exhibit a higher degree of elasticity. Formulating for these properties becomes limited by the desired rigidity and heat resistance properties of the finished foam product.

The liquid unsaturated polyester resins are employed in conjunction with a free-radical curing compound or a compound capable of forming a free radical. The cross-linked initiating compound of the invention is usually an organic peroxide or an organic hydroperoxide. Such peroxides are characterized by their reaction with metal salts or metal soaps which are a general class of agents known as accelerators or promoters. Suitable peroxides include, but are not limited to saturated aliphatic hydroperoxides, olefinic hydroperoxides, aralkyl hydroperoxides, hydroperoxides of cycloaliphatic and heterocyclic organic molecules, dialkyl peroxides, transanular peroxides, peroxyesters, peroxy derivatives of aldehydes and ketones, hydroxyalkyl hydroperoxides, bis(hydroalkyl) peroxides, polyalkylidene peroxides, peroxy acetals, methyl hydroperoxide, ethyl hydroperoxide, t-butyl hydroperoxide, dimeric benzaldehyde peroxide, dimeric benzophenone peroxide, demeric acetone peroxide, methylethyl ketone hydroperoxide, etc.

It should be noted that these organic (hydro-) peroxides are not available in commerce at 100 percent concentrations. Rather, they are used diluted in a suitable carrier such as an organic solvent. In addition, the so-called active oxygen content of such commercial peroxides may vary depending on the type of peroxides as well as storage conditions and age. Nevertheless, the amounts of peroxide stated reflect the total peroxide compositions usually containing about 50% peroxide compound. Proper adjustment of peroxide concentrations in the polyester resins may have to be made when using peroxide compositions containing substantially lower levels of active peroxide (for further information see Jacyzyn et al, "Methyl ethyl ketone peroxides, relationship of reactivity to chemical structure," paper presented at 32nd Annual Technical Conference, 1977 Society of the Plastics Industry).

Preferred peroxides are alkoxy peroxides which are activated at relatively low or ambient temperature, i.e., as low as 15° C., normally at about 20°–50° C. The most preferred peroxide is methyl ethyl ketone peroxide.

The heavy metal promoter of the invention should be understood to be a metal salt wherein the metal cation is selected from cobalt, nickel, chromium, manganese, tin, lead and iron, cobalt being preferred; and an anion based on an organic acid usually having 2–20 carbon atoms including acetic acid, propionic acid, butyric acid, 2-ethylhexanoic acid, hexanoic acid, octanoic acid, aluric acid, oleic acid, linoleic acid, palmitic acid, stearic acid, naphthenic acid; also complexes of such metals as acetoacetone may be used. The preferred promoters are salts based on cobalt, especially 2-ethylhexanoate, octanoate and naphthenate.

The alkali metal salts are based on essentially the same acids mentioned above except that the cation is formed by lithium, sodium or potassium, the latter being preferred.

Usually the anion is the same for the heavy metal salt and the alkali metal salt, although it is not critical for the purpose of this invention.

The chemical blowing agents suitable for preparing the foamed and cured polyester are mono-substituted sulfonyl hydrazide having the structural formula $RSO_2NHNH_2$, wherein R is a hydrocarbyl radical selected from $C_1$–$C_{12}$ alkyl, $C_5$–$C_6$ cycloalkyl, $C_7$–$C_{10}$ aralkyl, phenyl, naphthyl, also phenyl substituted with halogen, $C_1$–$C_{12}$ alkyl, or $C_1$–$C_{12}$ alkoxy. Especially suitable are such sulfonyl hydrazides wherein R is $C_2$–$C_4$ alkyl, benzyl, phenyl substituted with chlorine or $C_1$–$C_{12}$ alkyl. Examples of suitable sulfonyl hydrazides are methanesulfonyl hydrazide, ethanefulfonyl hydrazide, 1- or 2-propanesulfonyl hydrazide, n-butanesulfonyl hydrazide, sec-butanesulfonyl hydrazide, tert-butanesulfonyl hydrazide, isobutanesulfonyl hydrazide, pentanesulfonyl hydrazide, hexanesulfonyl hydrazide, heptanesulfonyl hydrazide, octanesulfonyl hydrazide, nonanesulfonyl hydrazide, decanesulfonyl hydrazide, dodeanesulfone hydrazide, cyclopentanesulfonyl hydrazide, cyclohexanesulfonyl hydrazide, benzenesulfonyl hydrazide, naphtalenesulfonyl hydrazide, toluenesulfonyl hydrazide, ethylbenzenesulfonyl dihydrazide, demethylbenzenesulfonyl hydrazide, butylbenzenesulfonyl dihydrazide, hexylbenzenesulfonyl hydrazide, ocxtylbenzenesulfonyl hydrazidem decylbenzenesulfonyl hydrazide, dodecylbenzenesulfonyl hydrazide, methoxybenzenesulfonyl hydrazide, ethoxybenzenesulfonyl hydrazide, butoxybenzenesulfonyl hydrazide, hexoxybenzenesulfonyl hydrazide, decoxybenzenesulfonyl hydrazide, dodecoxybenzenefulfonyl hydrazide, chlorobenzenesulfonyl hydrazide, fluorobenzenesulfonyl hydrazide, bromobenzesulfonyl hydrazide, iodobenzenesulfonyl hydrazide, benzylsulfonyl hydrazide, phenethanesulfonyl hydrazide, phenylpropanesulfonyl hydrazide, phenylbutanesulfonyl hydrazide, phenylhexanesulfonyl hydrazide.

Surfactants (surface active agents) suitable for making polyester foam are well known in the art. Silicone alkylene glycol co- and block co-polymers are preferred, although others are applicable such as ethyoxylated alkylphenols and fluorohydrocarbons. Representative examples are nonylphenyl polyethylene glycol ether, nonylphenoxy poly(ethyleneoxy) ethanol, di-tridecyl sodium succinate, stearyl dimethylbenzylammonium chloride, block copolymers of dimethylpolysiloxane with poly(ethylene oxide) or poly(propylene oxide) and the like.

Although the effect of surface active agents is beneficial toward cell stabilization, they are not essential for carrying out the invention.

According to this invention, compositions are prepared which are capable of simultaneous cure and expansion.

The foamed and cured polyesters according to this invention can be obtained in various ways, i.e., all of the ingredients except for the organic (hydro-) peroxide may be premixed and the peroxide then blended in shortly prior to manufacture of the foamed products. Alternatively, to a portion of the total polyester resin (10 to 90% by weight of the total polyester) may be added all the components except the peroxide catalyst, the latter being blended with a second portion of the remaining 90 to 10% (of the polyester) of the resin; both portions are then mixed together. The final composition, being within the limits outlined previously, will provide the desired foamed and cured product. Variations of the above may be adopted according to the particular need and circumstance. Thus, one embodiment of the invention involves initially mixing some or all of the polyester (i.e., from 10 to 100 parts of polyester) with the other ingredients except the organic (hydro-) peroxide curative. This mixture is useful for subsequent addition of the curative and (if less than 100 parts of polyester was used initially) with additional polyester (up to 90 parts) to bring the total amount of polyester to 100 parts.

The compositions of this invention are suitable for casting and spray applications when making products such as shower stalls, bathtubs, furniture, automotive body parts, paneling, packaging, floatation articles, air conditioner and humidifier housings, snowmobile front ends, lawnmower housings; bus, truck and tractor components; laminar structures, boats, and the like.

In spray applications, the same general approach as mentioned above may be used. Generally, spray application calls for short gel time, and the final composition is usually achieved by employing either internally or externally mixing spray guns, as is well known to the art.

In oder to carry out this invention, the practitioner will realize that peroxide promoter should be added at levels at the higher end of the described limits when thin sheet-like products are manufactured whereas lower such levels are advisable when relatively thick parts are produced in order to avoid unnecessarily high exotherm.

The expansion and cure of the polyester resin composition is effected simply by exposing the described mixture to expanding and curing conditions. For this purpose ordinary ambient conditions are suitable, since the reaction proceeds spontaneously after the ingredients are mixed. Application of heat is not necessary; the reaction itself is exothermic. If desired, heat may be applied, particularly in a post curing stage.

Based on 100 parts of polyester resin, the other ingredients may be added at the following parts (by weight) levels:

Chemical Blowing Agent: 0.5 to 10, generally 1 to 5.
Surfactant: 0-2, usually 0.5-1.5.
Filler: 0-250, usually 0-150.
Organic (hydro) Peroxide: 0.3 to 2.5, usually 0.5-2.0.

The molar heavy metal/alkali metal ratio in the polyester resin ought to be maintained at 10/1 to 1/10, preferably 10/1 to 1/5 and usually at 5/1-½. As this ratio is lowered, the time to develop gel in the polyester resin is generally increased although the foam density is essentially the same. The heavy metal and alkali metal organic salts may be added to the polyester resin, either separately or as a mixture. From a practical standpoint, the latter approach is preferred.

The following examples illustrate this invention in more detail.

The ingredients used are identified as follows:

PER: Polyester resin blend of about 40 parts styrene with about 60 parts of resin, reaction product of circa 1 mol isophthalic anhydride, 1 mol maleic anhydride and 2 mol propylene glycol.
MEKP: Methyl ethyl ketone peroxide (50% in plasticizer).
Co-12: Cobalt octanoate (12% Co).
K-20: Potassium 2-ethylhexanoate (20% K).
SAA: Surface active agent; silicon-glycol liquid polymer (Dow Corning 193 [trademark]).
CBA: Chemical blowing agent; p-toluenesulfonyl hydrazide.

EXAMPLE 1

To a 215 ml wax-coated paper cup were introduced 100 g PER, 2 g CBA, 0.28 g Co-12, 0.016 g K-20 and 1 g SAA. The mixture was stirred thoroughly with an electric mixer until all ingredients were dissolved. While stirring slowly, 2 g of MEKP was charged. Agitation was stopped, and development of gel was observed by the so-called snap-back method, i.e., about every 10 seconds, a small glass rod was introduced into surface of the resin (ca. 5 mm) and quickly removed. When the polyester resin tended to snap back rather than to flow from the rod, then the time elapsed from beginning of peroxide introduction to the snap-back point was recorded as gel time.

After the reaction exotherm has dissipated, the density of the product was measured by water immersion. The results of this experiment are recorded in Table I.

EXAMPLES 2-6

Following essentially the procedure of Example 1, additional experiments were undertaken investigating various molar Co/K ratios, all other ingredients being the same. The results can also be found in Table I.

TABLE I

| Example | 1 | 2 | 3 | 4 | 5 | 6 |
|---|---|---|---|---|---|---|
| PER, g | 100 | 100 | 100 | 100 | 100 | 100 |
| CBA, g | 2 | 2 | 2 | 2 | 2 | 2 |
| MEKP, g | 2 | 2 | 2 | 2 | 2 | 2 |
| SAA, g | 1 | 1 | 1 | 1 | 1 | 1 |
| Co—12, g | 0.28 | 0.27 | 0.24 | 0.19 | 0.14 | 0.08 |
| K—20, g | 0.016 | 0.03 | 0.07 | 0.11 | 0.16 | 0.22 |
| Co/K, molar | 10/1 | 5/1 | 2/1 | 1/1 | 1/2 | 1/5 |
| Gel time, seconds | 320 | 345 | 360 | 375 | 440 | 720 |
| FD$^{(1)}$, g/cm$^3$ | 0.73 | 0.72 | 0.66 | 0.73 | 0.64 | 0.73 |
| DR$^{(2)}$, % | 34 | 35 | 40 | 34 | 42 | 34 |

Remarks:
$^{(1)}$FD: foam density
$^{(2)}$DR: density reduction

The results in this table clearly indicate that most satisfactory foam can be produced using a combination of organic heavy metal salt and organic alkali metal at various molar ratios.

EXAMPLES

Additional polyester foams were prepared in accordance with the procedure of Example 1 with certain differences in ingredients and ingredient levels indicated in Table II with the results.

TABLE II

| Example | 7 | 8 | 9 | 10 | 11 | 12 | 13 |
|---|---|---|---|---|---|---|---|
| PER, g | 100 | 100 | 100 | 100 | 100 | 100 | 100 |
| CBA, g | 2 | 2 | 2 | 2 | 2 | 2 | 2 |
| SAA, g | 1 | 1 | 1 | 1 | 1 | 1 | 1 |
| MEKP, g | 2 | 2 | 2 | 2 | 2 | 2 | 2 |
| Co.—12, g | — | — | — | — | 0.1 | 0.3 | 0.5 |
| CoKM$^{(1)}$, g | 0.1 | 0.3 | 0.5 | 1.0 | — | — | — |
| Co conc.$^{(2)}$ | 0.003 | 0.009 | 0.015 | 0.03 | 0.012 | 0.036 | 0.06 |
| K conc.$^{(3)}$ | 0.005 | 0.015 | 0.025 | 0.05 | — | — | — |
| M conc.$^{(4)}$ | 0.008 | 0.024 | 0.040 | 0.08 | 0.012 | 0.036 | 0.06 |
| Gel time, seconds | 1740 | 510 | 204 | 104 | 300 | 105 | 92 |
| Cure,$^{(5)}$ minutes | soft | 19.5 | 9.5 | 4.5 | soft | soft | — |
| FD, g/cm$^3$ | 0.84 | 0.78 | 0.70 | 0.61 | 0.86 | 0.81 | 0.66 |
| DR, % | 24 | 29 | 36 | 45 | 22 | 46 | 40 |

Remarks:
$^{(1)}$Mixture of cobalt octanoate (3% Co) and potassium octanoate (5% K)
$^{(2)}$Cobalt concentration per 100 parts (weight) of PER.
$^{(3)}$Potassium concentration per 100 parts (weight) of PER.
$^{(4)}$Total metal concentration, pph of PER.
$^{(5)}$Cure to a solid state.

The results of the Table demonstrate the unexpected superiority of the cobalt/potassium promoter mixture over the sole cobalt promoter as far as gel time, state of cure and density reduction are concerned.

What is claimed is:

1. A foamable and simultaneously curable polyester composition consisting essentially of, all parts being by weight:
   (a) 100 parts liquid unsaturated polyester resin,
   (b) 0.5 to 10 parts monosubstituted sulfonyl hydrazide having the formula RSO$_2$NHNH$_2$, wherein R is C$_1$-C$_{12}$ alkyl, C$_5$-C$_6$ cycloalkyl, C$_7$-C$_{10}$ aralkyl, phenyl, naphthyl, or phenyl substituted with halogen, C$_1$-C$_{12}$ alkyl or C$_1$-C$_{12}$ alkoxy,
   (c) 0.1 to 5.0 parts of a promoter, said promoter consisting essentially of a mixture of organic heavy metal salt and organic alkali metal salt, wherein the heavy metal/alkali metal molar ratio is from 10/1 to 1/10,
(d) 0 to 2 parts surfactant,
(e) 0 to 250 parts of filler, and
(f) 0.3 to 5 parts of a cross-linking initiating compound selected from organic peroxides and organic hydroperoxide.

2. The composition of claim 1 wherein the concentration of (b) is 0.5 to 1.5 parts by weight, of (d) is 0.5 to 1.5 and of (e) is 0.5–20.

3. The composition of claim 1 wherein in (c) the heavy metal is cobalt and the alkali metal is potassium.

4. The composition of claim 3 wherein the surfactant is a silicon-glycol polymer.

5. The composition of claim 3 wherein the chemical blowing agent is p-toluene sulfonyl hydrazide.

6. The composition of claim 3 wherein the molar ratio of heavy metal/alkali metal of (c) is from 5/1 to ½.

7. A method for preparing a foamed and cured polyester resin consisting essentially of providing a composition as in any of claims 1 to 6 by:
(A) preparing a blend of 10–90 percent by weight of the (a) with (b), (c), (d) and (e),
(B) preparing a blend of correspondingly 90–10 percent of the (a) with and (f),
(C) mixing the blends resulting from steps (A) and (B) and exposing the mixtures to foaming and curing conditions.

8. A method for preparing a foamed and cured polyester resin consisting essentially of providing a composition as in any of claims 1 to 6 by:
(A) preparing a mixture of (a), (b), (c), (d) and (e)
(B) adding (e) to the mixture and exposing the mixture to foaming and curing conditions.

* * * * *